United States Patent [19]
Mohr et al.

[11] Patent Number: 6,111,057
[45] Date of Patent: Aug. 29, 2000

[54] POLYMER AND PROCESS FOR THEIR PRODUCTION

[75] Inventors: Bernhard Mohr, Schwäbisch Hall; Dieter Boeckh, Limburgerhof, both of Germany; Sherri Randall, Hamilton, Ohio; Rajan Panandiker, West Chester, Ohio; Eugene Paul Gosselink, Cincinnati, Ohio

[73] Assignee: BASF Aktiengesellschaft, Ludwigshafen, Germany

[21] Appl. No.: 09/131,234

[22] Filed: Aug. 7, 1998

Related U.S. Application Data

[60] Provisional application No. 60/055,152, Aug. 8, 1997.

[51] Int. Cl.⁷ .................................................. C08G 69/10
[52] U.S. Cl. .......................... 528/328; 528/310; 528/332; 525/419; 525/420
[58] Field of Search ..................................... 528/328, 310, 528/332; 525/419, 420

[56] References Cited

U.S. PATENT DOCUMENTS

| | | |
|---|---|---|
| 3,651,023 | 3/1972 | Ottenheym et al. . |
| 4,126,628 | 11/1978 | Paquet . |
| 4,892,927 | 1/1990 | Meyer et al. . |
| 4,959,452 | 9/1990 | Meyer et al. . |
| 5,028,689 | 7/1991 | Heinz et al. . |

*Primary Examiner*—Duc Truong
*Attorney, Agent, or Firm*—Oblon, Spivak, McClelland, Maier & Neustadt, P.C.

[57] ABSTRACT

An amino acid based polymer, oligomer or copolymer containing at least 5 mol % of units of a basic amino acid selected from the group consisting of lysine, argenine, ortnithine, trgptophane and mixtures thereof and at least about 5 mol % of a polymerizable compound selected from the group consisting of aliphatic or cycloaliphatic amines, alicyclic amines, diamines, triamines, tetraamines, aliphatic amino alcohols or mixtures thereof, an a process for the production of the said polymer, oligomer or copolymer by condensing at a temperature of at least 120° C. said basic amino acid with at least one of said polymerizable compounds.

30 Claims, No Drawings

POLYMER AND PROCESS FOR THEIR PRODUCTION

CROSS REFERENCE

Under Title 35 U.S.A. 119(e), This Application claims the benefit of Provisional Application Ser. No. 60/055,152, filed Aug. 8, 1997.

DESCRIPTION

1. Technical Field

The present invention relates to certain amino acid based polymer, oligomer or copolymer materials and to a process for their production.

2. Background of the Invention

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may form lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function.

SUMMARY OF THE INVENTION

Amino acid based polymer, oligomer or copolymer materials which are suitable for use in laundry operations can be characterized by containing units of an amino acid and units of a polymerizable compound, having the general formula:

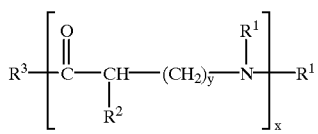

wherein the polymer, oligomer or copolymer contains at least about 5 mole %, of a basic amino acid, each $R^1$ is selected from the group consisting of H, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl and $C_7$–$C_{18}$ alkylaryl;

each $R^2$ is independently selected from the group consisting of H, $NH_2$,

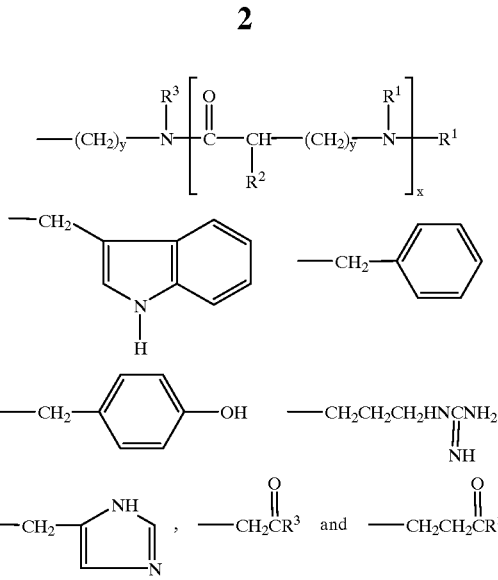

each $R^3$ is independently selected from the group consisting of OH, OM, N $(R^1)_2$,

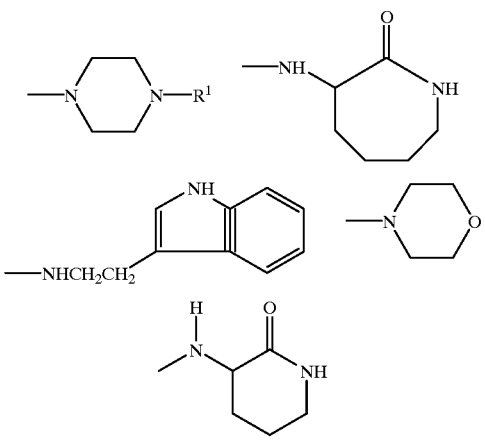

and

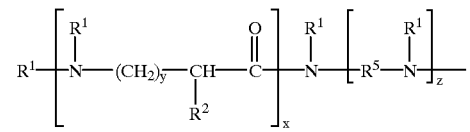

each $R^5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, $C_3$–$C_{12}$ cyclic oxa-substituted alkylene, and

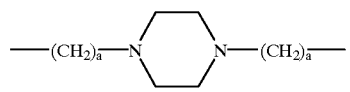

wherein:
each x is independently from 0 to about 200,
each y is independently from 0 to 10, preferably 0, 3, or 4
each z is independently from 1 to about 7 each a is independently from about 1 to about 12,

M is selected from compatible cations; and provided that:

the sum of all x's is from 2 to about 200;

any basic amine site on the polymer, oligomer, or copolymer may be optionally protonated, alkylated or quaternized with groups selected from the group consisting of H, alkyl, hydroxyalkyl, benzyl and mixtures thereof, any amine site may be optionally alkoxylated, and when two $R^1$ groups are attached to a common nitrogen, the two $R^1$'s may form a cyclic structure selected from the group consisting of $C_5$–$C_8$-alkylene, and $C_4$–$C_7$-alkyleneoxyalkylene.

Preferred are copolymeres which contain at least about 10 mole % more preferably from about 20 mole % and most preferably at least about 40 mole % of a basic amino acid and wherein the sum of all x's is from about 3 to 150, more preferably from about 5 to about 120, and most preferably from about 5 to about 100.

The essential component of the compositions of the present invention comprise one or more amino acid-based polymer, oligomer or copolymer. The amino acid based polymer, oligomer or copolymer component of the compositions herein may comprise combinations of these amino acid based materials. For example, a mixture of lysine and hexamethylenediamine condensates can be combined with a mixture of lysine and octylamine condensates.

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of greater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary amino acid based monomer, e.g., lysine, and a secondary amino acid monomer, e.g. tryptophane.

The polymers of the invention contain units of basic amino acid which is preferably selected from the group consisting of lysine, argine, ornithine, tryptophane and mixtures thereof. Polymers which contain units of lysine are preferred.

The amino acid polymer, oligomer or copolymer further contain units of at least one polymerizable compound which is for example a $C_6$- to $C_8$-alkylamine, preferably an amine selected from the group consisting of hexamethylenediamine, octylamine, monoethanolamine, octamethylenediamine, diaminododecane, decylamine, dodecylamine or mixtures thereof. The amino acid based copolymers preferably comprise lysine and hexamethylenediamine condensates of the general formula:

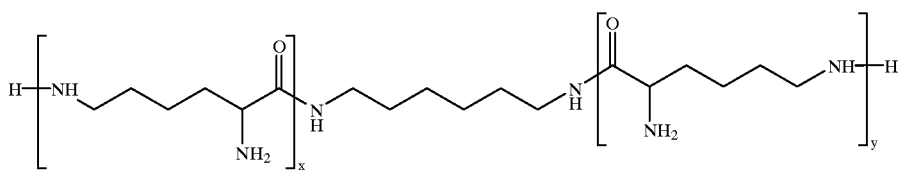

wherein r and s are individually from 0 to about 50, provided that r+s>0. The molar ratio of lysine:polymerizable compound is 100:1, preferably 10:1 and more preferably 5:1.

As is illustrated in Example 1 below, the lysine and hexamethylenediamine condensates of the present invention are often a mixture of various molecules having different values for r+s. Especially preferred are lysine and hexamethylenediamine condensates which have r+s equal to from about 2 to about 10. The above, simplified structure depiction is meant to include also those oligomers and polymers with branching which arises from amide bond linkages formed at the alpha amino group and from amide bond linkages formed at both amino groups of a single lysine-derived unit.

Compositions which are also preferred are condensates of lysine and $C_6$- to $C_{18}$-alkylamines lysine and octylamine can be characterized by the following simplified formula:

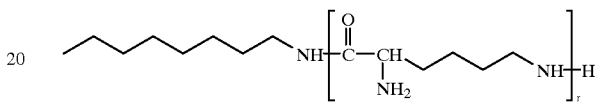

wherein r is from about 1 to about 50.

Compositions which are also preferred for use herein are condensates of lysine and non-proteinogenic amino acids and condensates of lysine and lactams of the general formula:

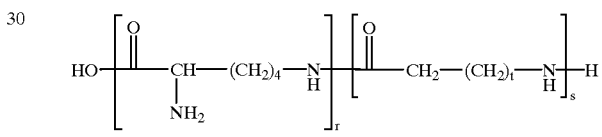

wherein z is independently from 0 to 12 and the molar ratio of r to s is preferably 20:1 to 1:20, more preferably from 10:1 to 1:10, and most preferably from 5:1 to 1;5, t is independently from 2 to 10, preferably 4 or 10.

The above, simplified structure depiction is meant to also include those oligomers and polymers with branching which arises from amide bond linkages formed at the alpha amino group and from amide bond linkages formed at both amino groups of a single lysine-derived unit. The sequence of monomer units can be of a random or block-type structure.

The amino acid based polymer, oligomer or copolymer mixture is produced by condensing a reaction mixture comprising (a) an amino acid selected from the group consisting of lysine, arginine, ornithine, tryptophane and mixtures thereof and (b) at least one polymerizable compound selected from the group consisting of aliphatic or cycloaliphatic amines, alicyclic amines, diamines, triamines, tetramines, monoamine carboxylic acids, lactams having 5 to 13 atoms in the ring, aliphatic amino alcohols, urea, quanidine, melamine and mixtures thereof at a temperature of at least 120° C.

Compounds a) can be lysine, arginine, ornithine, tryptophane as well an the corresponding hydrates, esters of lower (C1–C4) alcohols and salts such as sulfates, hydrochlorides and acetates. Lysine hydrate and aqueous solutions of lysine are preferably used. Lysine can also be used in form of its cyclic lactam, alpha-amino-epsilon-caprolactam. Lysine mono- or dihydrochlorides or the mono- or dihydrochlorides of lysine esters may also be used. When hydrochlorides are used, approximately equivalent quantities of (inorganic) bases must be added for neutralization (i.e. one equivalent of base in the case of monohydrochlorides and two equivalents in case of dihydrochlorides).

The alcohol compounds used in monohydrochlorides and dihydrochlorides of lysine esters may in particular be of low boiling alcohols such as methanol, ethanol or optionally tert.-butanol. Preferred lysine hydrochlorides are L-lysine dihydrochloride, DL-lysine monohydrochloride and L-lysine monohydrochloride. L-lysine monohydrochloride is particularly preferred. The individual optical antipodes of lysine may be used as lysine components or any mixture thereof, e.g. the racemate.

Examples for polymerizable compounds (b) are aliphatic and cycloaliphatic amines, preferably methylamine, ethylamine, propylamine, butylamine, pentylamine, hexylamine, heptylamine, octylamine, nonylamine, decylamine, undecylamine, dodecylamine, tridecylamine, stearylamine, palmitylamine, 2-ethylhexylamine, isononylamine, hexamethyleneimine, dimethylamine, diethylamine, dipropylamine, dibutylamine, dihexylamine, ditridecylamine, N-methylbutylamine, N-ethylbutylamine; alicyclic amines, preferably cyclopentylamine, cyclohexylamine, N-methylcyclohexylamine, N-ethylcyclohexylamine, dicyclohexylamine;

diamines, triamines and tetraamines, preferable ethylenediamine, propylenediamine, butylenediamine, neopentyldiamine, hexamethylendiamine, octamethylenediamine, imidazole, 5-amino-1,3-trimethylcyclohexylmethylamine, diethylenetriamine, dipropylenetriamine, tripropyltetraamine, 4,4'-methylenebiscyclohexylamine, 4,4'-methylenebis(2-metbylcycloheylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-(2-aminoethyl)aminopropylamine, 2-(diethylamino)ethylamine, 3-(dimethylamino)propylamine, dimethyldipropylenetriamine, 4-aminomethyloctane-1,8-diamine, 3-(diethylamino) propylamine, N,N-diethyl-1,4-pentanediamine, diethylenetriamine, dipropylenetriamine, bis(hexamethylene)triamine, aminoethylpiperazine, aminopropylpiperazine, N,N-bis(aminopropyl)methylamline, N,N-bis(aminopropyl)ethylamine, N,N-bis(aminopropyl)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N,N'-1,2-ethanediylbis-(1,3-propanediamine), N-(aminoethyl)piperazine, N-(2-imidazole)piperazine, N-ethylpiperazine, N-(hydroxyethyl)piperazine, N-(aminoethyl)piperazine, N-(aminopropyl)piperazine, N-(aminoethyl)morpholine, N-(aminopropyl)morpholine, N-(aminoethyl)imidazole, N-(aminopropyl)imidazole, N-(aminoethyl)hexamethylenediamine, N-(aminopropyl)hexamethylenediamine, N-(aminoethyl)ethylenediamine, N-(aminopropyl)ethylenediamine, N-(aminoethyl)butylenediamine, N-(aminopropyl)butylenediamine, bis(aminoethyl)piperazine, bis(aminopropyl)piperazine, bis(aminoethyl)hexamethylenediamine, bis(aminopropyl)hexamethylenediamine, bis(aminoethyl)ethylenediamine, bis(aminopropyl)ethylenediamine, bis(aminoethyl)butylenediamine, bis(aminopropyl)butylenediamine, oxypropylamines, preferably hexyloxyamine, octyloxyamine, decyloxyamine, dodecyloxyamine;

aliphatic amino alcohols, preferably 2-aminoethanol, 3-amino-1propanol, 1-amino-2-propanol, 2-(2-aminoethoxy)ethanol, 2-[2-aminoethyl)amino]ethanol, 2-methylaminoethanol, 2-(ethylamino) ethanol, 2-butylaminoethanol, diethanolamine, 3-[(hydroxyethyl)amino]-1-propanol, diisopropanolamine, bis(hydroxyethyl)aminoethylamine, bis(hydroxypropyl)aminoethylamine, bis(hydroxyethyl) aminopropylamine, bis(hydroxypropyl) aminopropylamine;

monoamino carboxylic acids, preferably glycine, alanine, sarcosine, asparagine, glutamine, 6-aminocaproic acid, 4-aminobutyric acid, 11-aminolauric acid, lactams having 5 to 13 atoms in the ring such as caprolactam,laurolactam or butylrolactam; and glucoseamine, melamine, urea, guanidine, polyguanides, piperidine, morpholine, 2,6-dimethylmorpholine, tryptamine.

The polymerizable compound is preferably selected from hexamethylenediamine, octylamine, monoethanolamine, octamethylenediamine, diaminododecane, decylamine, dodecylamine and mixtures thereof. In the production of the amino acid based polymers the molar ration of (a):(b) is for example 100:1 to 1:20 preferably of from 10:1 to 1:10, most preferably of from 5:1 to 2:1. Units of lactams correspond to units of ω-amino carbonxylic acids because lactams normally polymerize under opening of the lactam ring.

The condensation can be carried out in substance, in an organic solvent or in an aqueecns medium. It is of advantage to conduct the condensation in water at a concentration of (a) and (b) of from 10 to 98% by weight at a temperature of from 120° to 300° C. In a preferred embodiment of the process according to the invention the condensation is carried out in water at a concentration of (a) and (b) of from 20 to 70% by weight under pressure at a temperature of from 140° to 250° C. The condensation of the compounds (a) and (b) can also be carried out in an organic solvent such as dimethylformanide, dimethylsulfoxide, dimethylacetamide, glycol, polyethylene glycol, propylene glycol, polypropylene glycol, monovalent alcohols, addition products of ethylene oxide and/or propylene oxide to mono valent alcohols, amines or carboxylic acids, The condensation of compounds (a) and (b), can, for example, be started in the presence of water either in an aqueous solution or in an organic solvent containing water. The condensation of the compounds can be carried out in the presence of water. Alternatively, water may be distilled off before the compounds are condensed. The condensation can also be carried out under removal of water. During the condensation water is formed. The water formed during the condensation is preferably removed from the reaction mixture. This can be carried out under superatmospheric pressure, under normal pressure or under reduced pressure. The condensation time depends on the devoice of reaction condition. In general it will be within the range from 1 minute to 50 hours, preferably from 30 minutes to 16 hours. Polycondensates having a low molecular weight can also be prefared in a pressure-tightly sealed vessel by removing only some if any of the water formed in the course of the polycondensation.

If desired, the condensation can be carried out in the presence of an acid as catalyst. The concentration of the acid, with reference to (a) and (b), may be of from 0.001 to 5, preferably of from 0.01 to 1.0% by weight. Examples of suitable acids are mineral acids such as hypophosphorous acid, hypodiphosphorous acid, phosphorous acid and their mixtures and organic acids such as p-toluenesulfonic acid, benzenesulfonic acid and methanesulfonic acid. In addition to the acids their alkali, ammonium and alkaline earth metal salts can be used as catalyst. As an alternative, those compounds (b) which form ammonium salts with the said acids can also be condensed with lysine or the other basic amino acids. If desired, an acid catalyst may be added.

The condensation products of (a) and (b) have for example a molecular weight of from 300 to 20,000, preferably of from 500 to 5000. They are generally soluble in water or can be easily dispersed therein. The condensation products may be used as additive for detergents, as fabric softeners and/or other laundry additives.

The weight average molecular weights (Mw) are measured by aqueous gel permeation chromatography (GPC) using a mixture of acetonitril and water 20/80 v/v as the mobile phase, Waters Ultrahydrogel 500, 250, 250, 120 columns and UV detection at a wavelength of 230 nm. Pullulane standards with narrow molecular weight distributions were used for the calibration.

EXAMPLE 1

Condensation of L-lysine and 1,6-hexanediamine in a molar ratio of 5:1

L-lysine (1078.7 g, 7.38 mol), 1,6-hexanediamine (171.5 g, 1.48 mol), and propylene glycol (approximately 1 L) are added to a 5 L, three neck, round bottom flask which is equipped with a magnetic stirring bar, modified Claisen head, condenser (set for distillation), thermometer, and temperature controller. The solution is blanketed with argon and heated at 170° C. for 4 hrs as water distills from the reaction. A $^{13}$C-NMR ($D_2O$) shows the emergence of a peak at approximately 177 ppm which corresponds to an amide product. A smaller peak at approximately 181 ppm may represent some unreacted L-lysine. The bulk solution is then divided into six 1 L round bottom flasks, and each flask is heated on a Kugelrohr apparatus at approximately 170° C. and approximately 2 mm Hg for 3 hrs to remove solvent and volatile products. The flasks are cooled to room temperature to afford 915 g of dark brown, thick liquid. A $^{13}$C-NMR ($D_2O$) shows that the peak at approximately 181 ppm has virtually disappeared. The material is dissolved in water and adjusted to a pH of approximately 7.5 with methanesulfonic acid to form about a 23% stock solution.

EXAMPLE 2

Condensation of L-lysine and ε-caprolactam in a molar ratio of 1:1

684 g of an 50% aqueous solution of L-lysine (365.2 g, 2.5 mol), epsilon-caprolactam (282.9 g, 2.5 mol), and 1 g sodium hypophosphite were placed in a 2 l reaction vessel equipped with an efficient stirrer and distillation head. The solution is heated under a constant stream of nitrogen to 160° C. for 8 h as water distills from the reaction. Following this, a water pump vacuum is applied for 1 h to remove residual amounts of solvent and volatile products. The reddish, slightly viscous melt is cooled to 125° C. and 400 g water are added slowly to result in a clear orange solution. This solution is further cooled to room temperature to give a low viscous liquid. 500 g of this solution are adjusted to a pH of approximately 7.5 with concentrated sulfuric acid 846 g) to form an 537% stock solution. The molecular weight of this poylymer was determined to $M_w$=3990.

EXAMPLE 3

Condensation of L-lysine and aminocaproic acid in a molar ratio of 1:1

719 g of an 60% aqueous solution of L-lysine (382.7 g, 2.62 mol), aminocaproic acid (344.8 g, 2.62 mol), and 1 g sodium hypophosphite were placed in a 2 l reaction vessel equipped with an efficient stirrer and distillation head. The solution is heated under a constant stream of nitrogen to 170° C. for 6 h as water distills from the reaction. Following this, a water pump vacuum is applied for 1 h to remove residual amounts of solvent and volatile products. The reddish, slightly viscous melt is cooled to 140° C. and 250 g water are added slowly to result in a clear orange solution. This solution is further cooled to room temperature to give al low viscous liquid. 500 g of this solution are adjusted to a pH of approximately 7.5 with concentrated sulfuric acid (46 g) to form about 65.7% stock solution. The molecular weight of this polymer was determined to $M_w$=2480.

EXAMPLE 4

Condensation of L-lysine and aminocaproic acid in a molar ratio of 1:1

L-lysine monohydrate (656.8 g. 4.0 mol), aminocaproic acid (524.7 g, 4.0 mol) and sodium hypophosphite (0.1 g) were placed in a pressurizable 2.5 l reaction vessel and blanketed with nitrogen. The reaction vessel was then sealed pressure tight and heated to 200° C. for 7 h, during which time the internal pressure rose to 7.65 bar. The pressure was then slowly released to atmospheric pressure to remove water from the reaction mixture. The reaction was then continued for 30 min at 180° C. and atmospheric pressure. The material solidified upon cooling to ambient temperature. An aliquot of this material was dissolved in water and adjusted to a pH of approximately 7.5 with concentrated sulfuric acid to form an approx. 54% stock solution. The molecular weight of the polymer was determined to be $M_w$=3550.

EXAMPLE 5

Condensation of L-lysine and aminocaproic acid in a molar ratio of 1:1

124.8 q of a 60% aqueous solution of L-lysine monobydrate (74.9 g, 0.46 mol), aminocaproic acid (59.8 g, 0.46 mol) and sodium hypohosphite (0.1 g) were placed in a pressurizable 0.5 l reaction vessel and blanketed with nitrogen. The reaction vessel was then sealed pressure tight and heated to 167° C. for 4 h, during which time the internal pressure rose to 3.1 bar. The pressure was then slowly released to atmospheric pressure to remove water from the reaction mixture. The reaction was then continued for 3 h at 170° C. and atmospheric pressure. The orange, slightly viscous melt was cooled to room temperature and 100 ml water were added to form a yellow solution. This solution was adjusted to a pH of approximately 7.5 with concentrated sulfuric acid (15 mL) to form an approx. 54% stock solution. The molecular weight of the polymer was determined to be $M_w$=740.

EXAMPLE 6

Condensation of L-lysine and octylamine in a molar ration of 3:1

L-lysine monohydrate (656.8 g, 4.0 mol), octylamine (524.7 g, 1.33 mol) and sodium hypophosphite (0.1 g) were placed in a pressurizable 2.5 l reaction vessel and blanketed with nitrogen. The reaction vessel was then sealed pressure tight and heated to 200° C. for 7 h, during which time the internal pressure rose to 10.90 bar. The pressure was then slowly released to atmospheric pressure to remove volatile materials from the reaction mixture. The reaction was then continued for 30 min at 180° C. and atmospheric pressure. Water (700 mL) was added to the reaction mixture upon cooling to room temperature. An aliquot of this solution was adjusted to a pH of approximately 7.5 with concentrated sulfuric acid to form an approx. 50% stock solution. The molecular weight of the polymer was determined to be $M_w = 850$.

What is claimed is:

1. A water-soluble or water-dispersible amino acid based polymer, oligomer or copolymer containing units of an amino acid and units of a polymerizable compound, wherein the amino acid based polymer has the general formula:

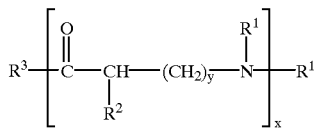

wherein the polymer, oligomer or copolymer contains at least about 5 mole % of a basic amino acid, each $R^1$ is selected from the group consisting of H, $C_1$–$C_{18}$ saturated or unsaturated, branched or linear alkyl, $C_2$–$C_{18}$ saturated or unsaturated, branched or linear hydroxyalkyl, $C_3$–$C_8$ cycloalkyl, $C_6$–$C_{18}$ aryl and $C_7$–$C_{18}$ alkylaryl;

each $R^2$ is independently selected from the group consisting of H, $NH_2$,

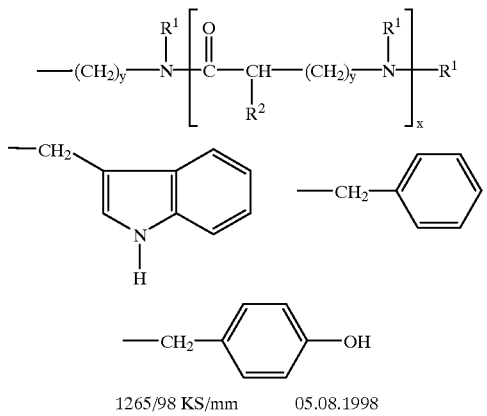

each $R^3$ is independently selected from the group consisting of OH, OM, $N(R^1)_2$,

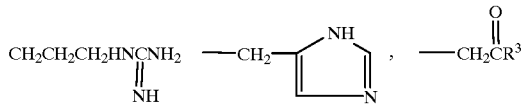

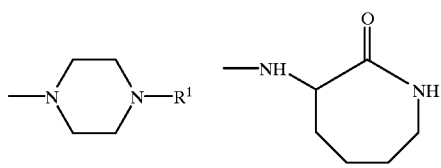

each $R^5$ is independently selected from the group consisting of $C_1$–$C_{12}$ linear or branched alkylene, cyclic alkylene, $C_2$–$C_{12}$ linear oxa-substituted alkylene, $C_2$–$C_{12}$ branched oxa-substituted alkylene, $C_3$–$C_{12}$ cyclic oxa-substituted alkylene, and

wherein:
each x is independently from 0 to about 200,
each y is independently from 0 to 10,
each z is independently from 1 to about 7
each a is independently from about 1 to about 12,
M is selected from compatible cations; and
provided that:
the sum of all x's is from 2 to about 200;
any basic amine site on the polymer, oligomer, or copolymer may be optionally protonated, alkylated or quaternized with groups selected from the group consisting of H, alkyl, hydroxyalkyl, benzyl and mixtures thereof,
any amine site may be optionally alkoxylated, and
when two $R^1$ groups are attached to a common nitrogen, the two $R^1$'s may form a cyclic structure selected from the group consisting of $C_5$–$C_8$-alkylene, and $C_4$–$C_7$-alkyleneoxyalkylene.

2. The amino acid based polymer, oligomer or copolymer mixture as claimed in claim 1, wherein the amino acid is lysine.

3. The amino acid based polymer, oligomer or copolymer mixture as claimed in claim 1, wherein the polymerizable compound is selected from one or more $C_6$- to $C_{18}$-alkylamines.

4. The amino acid based polymer, oligomer or copolymer as claimed in claim 1, wherein the polymerizable compound is selected from the group consisting of hexamethylenediamine, octylamine, monoethanolamine, octamethylenediamine, diaminododecane, decylamine, dodecylamine or mixtures thereof.

5. The amino acid based polymer, oligomer or copolymer mixture as claimed in claim 1, wherein the amino acid based polymer, oligomer or copolymer mixture comprises lysine and hexamethylenediamine condensates of the general formula:

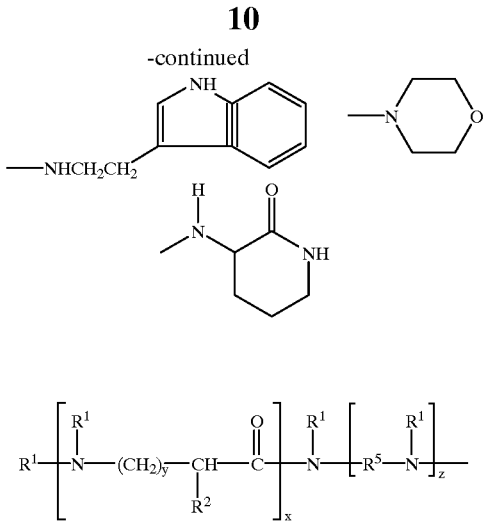

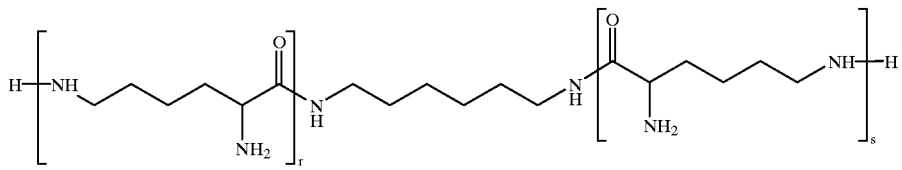

wherein r and s are individually from 0 to about 50, provided that r+s>0.

6. The amino acid based polymer, oligomer or copolymer mixture as claimed in claim 1, wherein the amino acid based polymer, oligomer or copolymer mixture comprises units of lysine and units of a lactam having 5 to 13 atoms in the ring, wherein the molar ratio of units of lysine to units of lactam is of from 20:1 to 1:20.

7. The amino acid based polymer, oligomer or copolymer mixture as claimed in claim 1, wherein the amino acid based polymer, oligomer or copolymer mixture comprises units of lysine and units of caprolactam, laurolactam, butyrolactam or their mixtures, wherein the molar ratio of lysine and units of the said lactams is of from 20:1 to 1:20.

8. The amino acid based polymer, oligomer or copolymer mixture as claimed in claim 1, wherein the molar ratio of lysine to polymerizable compound is of from 100:1 to 2:1.

9. The amino acid based polymer, oligomer or copolymer mixture as claimed in claim 1, wherein the molar ratio of lysine:polymerizable compound is 10:1 to 1:10.

10. The amino acid based polymer, oligomer or copolymer mixture as claimed in claim 1, wherein the molar ratio of lysine:polymerizable compound is 5:1 to 2:1.

11. The amino acid based polymer, oligomer or copolymer mixture as claimed in claim 1, wherein the molar ratio of lysine:polymerizable compound is 2:1.

12. A process for the production of an amino acid based polymer, oligomer or copolymer mixture as claimed in claim 1, wherein a reaction mixture comprising (a) an amino acid selected from the group consisting of lysine, arginine, ornithine, tryptophane and mixtures thereof and (b) at least one polymerizable compound selected from the group consisting of aliphatic or cycloaliphatic amines, alicyclic amines, diamines, triamines, tetramines, monoamine carboxylic acids, lactams having 5 to 13 atoms in the ring, aliphatic amino alcohols, urea, guanidine, melamine and mixtures thereof is polymerized at a temperature of at least 120° C.

13. A process as claimed in claim 12, wherein the polymerizable compound is selected from one or more $C_6$- to $C_{18}$ alkylamines.

14. As process as claimed in claim 12, wherein the polymerizable compound is selected from hexamethylenediamine, octylamine, monoethanolamine, octamethylenediamine, diaminododecane, decylamine, dodecylamine, and mixtures thereof.

15. A process as claimed in claim 12, wherein the molar ratio of (a):(b) is of from 100:1 to 1:20.

16. A process as claimed in claim 12, wherein the molar ratio of (a):(b) is of from 10:1 to 2:1.

17. A process as claimed in claim 12, wherein the molar ratio of (a):(b) is of from 5:1 to 2:1.

18. A process as claimed in claim 12, wherein the molar ratio of (a):(b) is of from 2:1.

19. A process as claimed in claim 12, wherein the condensation is carried out in water at a concentration of (a) and (b) of from 10 to 98% by weight under pressure at a temperature of from 120° to 300° C.

20. A process as claimed in claim 12, wherein the condensation is carried out in water at a concentration of (a) and (b) of from 20 to 70% by weight under pressure at a temperature of from 140° to 250° C.

21. A process as claimed in claim 12, wherein the condensation of components (a) and (b) is started in the presence of water and is continued under removal of water.

22. A process as claimed in claim 12, wherein the water formed during condensation is removed from the reaction mixture.

23. A process as claimed in claim 12, wherein components (a) and (b) are condensed in substance.

24. A process as claimed in claim 12, wherein the condensation is carried out in the presence of 0.001 to 5% by weight of an acid as catalyst.

25. The amino acid based polymer, oligomer or copolymer mixtures as claimed in claim 1, having a molecular weight of from 300 to 20,000.

26. The amino acid based polymer, oligomer or copolymer mixtures as claimed in claim 1, having a molecular weight of from 500 to 5,000.

27. The amino acid based polymer, oligomer or copolymer mixture as claimed in claim 1, containing at least about 10 mol % of a basic amino acid.

28. The amino acid based polymer, oligomer or copolymer mixture as claimed in claim 1, containing at least about 20 mol % of a basic amino acid.

29. The amino acid based polymer, oligomer or copolymer mixture as claimed in claim 1, containing at least about 40 mol % of a basic amino acid.

30. A laundry composition comprising an amino acid based polymer, oligomer or copolymer mixture as claimed in claim 1, and a detergent or a fabric softener.

* * * * *